(12) United States Patent
Carbonero

(10) Patent No.: US 7,213,819 B2
(45) Date of Patent: May 8, 2007

(54) GYM SCOOTER

(75) Inventor: Kurt K. Carbonero, Rochester, MI (US)

(73) Assignee: Pull-Buoy, Inc., Sterling Heights, MI (US)

( * ) Notice: Subject to any disclaimer, the term of this patent is extended or adjusted under 35 U.S.C. 154(b) by 820 days.

(21) Appl. No.: 10/392,209

(22) Filed: Mar. 18, 2003

(65) Prior Publication Data

US 2003/0155732 A1    Aug. 21, 2003

Related U.S. Application Data

(63) Continuation of application No. 09/844,464, filed on Apr. 27, 2001, now Pat. No. 6,561,530.

(51) Int. Cl.
*A63C 17/01* (2006.01)

(52) U.S. Cl. ................... 280/79.11; 280/87.05; 280/32.6

(58) Field of Classification Search ........... 280/87.041, 280/87.021, 87.042, 87.01, 32.6, 79.11, 87.05; 403/364, 384, 12, 13; 297/248, 249; 220/23.2, 220/23.4; 108/64, 185
See application file for complete search history.

(56) References Cited

U.S. PATENT DOCUMENTS

| | | | |
|---|---|---|---|
| 2,711,906 A | 6/1955 | Rideout et al. | |
| 2,766,993 A | 10/1956 | Reichelt | |
| 2,813,727 A * | 11/1957 | Whalen | 280/408 |
| 3,197,227 A | 7/1965 | Anselmo | |
| 4,721,316 A | 1/1988 | Whiteside | |
| D296,048 S | 6/1988 | Eie | |
| 5,074,572 A | 12/1991 | Delmerico et al. | |
| 5,445,396 A | 8/1995 | Sebor | |
| 5,494,305 A | 2/1996 | Chen | |
| 5,524,322 A | 6/1996 | Muehlen | |
| 5,531,465 A | 7/1996 | Aumasson | |
| D378,154 S | 2/1997 | Presnell | |
| 5,711,540 A | 1/1998 | Nesting | |
| 5,823,549 A | 10/1998 | Morgan, Jr. | |
| 5,860,369 A * | 1/1999 | John et al. | 108/57.26 |
| D414,305 S | 9/1999 | Rohn et al. | |
| D428,367 S | 7/2000 | Lundh | |
| 6,095,348 A * | 8/2000 | Karashima | 211/175 |
| 6,457,731 B1 * | 10/2002 | Paranto et al. | 280/249 |
| 6,550,794 B1 * | 4/2003 | Spindel et al. | 280/79.11 |
| 6,561,530 B2 * | 5/2003 | Carbonero | 280/87.041 |

OTHER PUBLICATIONS

Portion of Gym Closet Catalog, Gym Closet, 2000, pp. 101 and 102, Sterling Heights, Michigan.

* cited by examiner

*Primary Examiner*—Jeff Restifo
(74) *Attorney, Agent, or Firm*—Reising, Ethington, Barnes, Kisselle, P.C.

(57) ABSTRACT

A scooter includes a platform and at least three casters. The platform has a horizontal top surface and at least one vertical side surface extending downwardly from the top surface. The casters extend downwardly to support the platform when the platform rolls. The scooter also comprises a horizontal flange and a vertical flange. The horizontal flange extends away from the vertical side surface. The vertical flange extends from the horizontal flange. The vertical side surface, the horizontal flange and the vertical flange define a groove adapted to receive a mating tongue on a second scooter. This provides an integral, low-profile tongue-and-groove type of connection between two or more scooters.

3 Claims, 5 Drawing Sheets

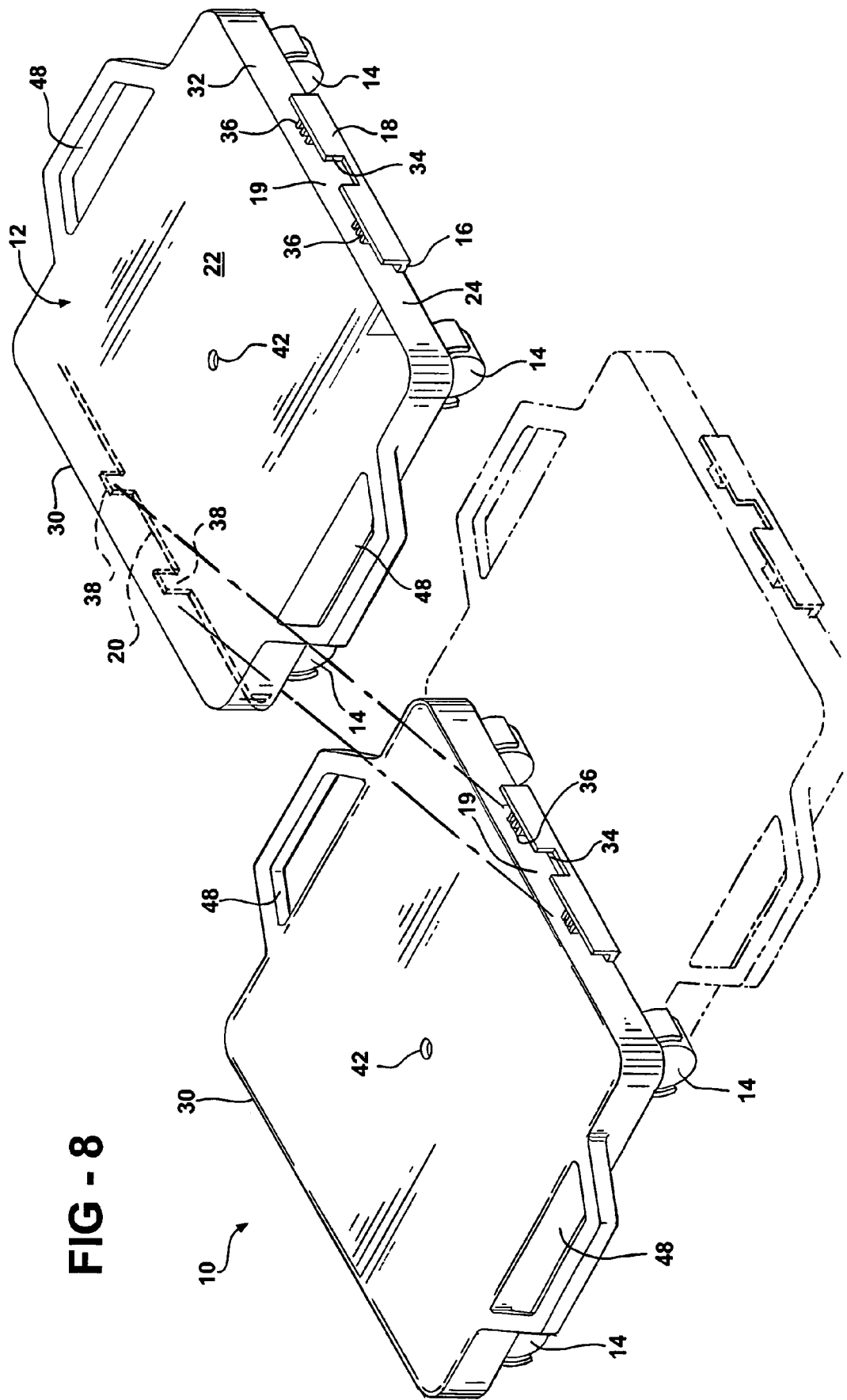

GYM SCOOTER

This is a continuation application of application Ser. No. 09/844,464 filed on Apr. 27, 2001 now U.S. Pat. No. 6,561,530, which is incorporated herein by reference.

TECHNICAL FIELD

The invention relates generally to a scooter, and more particularly to a scooter used for recreational purposes.

BACKGROUND

People skilled with gym equipment and sporting goods are familiar with using a scooter for recreational and physical education purposes. Propelling the scooter across a floor helps to build upper and lower body strength, and improve coordination. Sometimes people desire to use two or more scooters. For example, a single person may wish to move across the floor in a prone or supine position; or several people may wish to move together. But in either of these cases, movement can be clumsy or awkward—absent some firm connection between scooters—because the scooters may not move in the same direction.

The prior art addresses this problem by using an elongated connecting rod to connect two or more scooters together. But a problem arises if the connecting rod is not immediately available or otherwise lost—because the connecting rod is a separate item. Also, because the rod is elongated and narrow, it connects the scooters in a spaced-apart manner; and this is impractical and uncomfortable for the single user who wishes to lie flat across two or more scooters. Finally, because the connector is elongated and narrow, it may get broken if someone falls or steps on it.

SUMMARY OF THE INVENTION AND ADVANTAGES

The present scooter includes a platform and at least three casters extending downwardly from the platform to support the platform in rolling movement. The scooter further includes a horizontal flange extending away from the platform; and a vertical flange extending from the horizontal flange. In this way, the platform, the horizontal flange, and the vertical flange define a space that is adapted to receive a mating tongue on a second scooter whereby the scooter may connect with the second scooter.

This new arrangement provides for a low profile, integral connection. The low profile of the connection does not interfere with normal use and operation of the scooter, and is not likely to get broken. It is also integral with the scooter and will not get lost. Therefore, if one wants to connect two or more scooters, one does not need an additional connecting component. This new arrangement also provides a flush connection between two scooters. The flush connection is more elegant and simple, and this will afford comfort to one or more riders using multiple scooters attached together.

BRIEF DESCRIPTION OF THE DRAWINGS

The present invention will now be described, by way of example, with reference to the accompanying drawings, in which:

FIG. 8 is a top perspective view of two alternative embodiment scooters exploded away from each other to show the manner in which they connect.

DESCRIPTION OF THE PREFERRED EMBODIMENT

Figure 1:
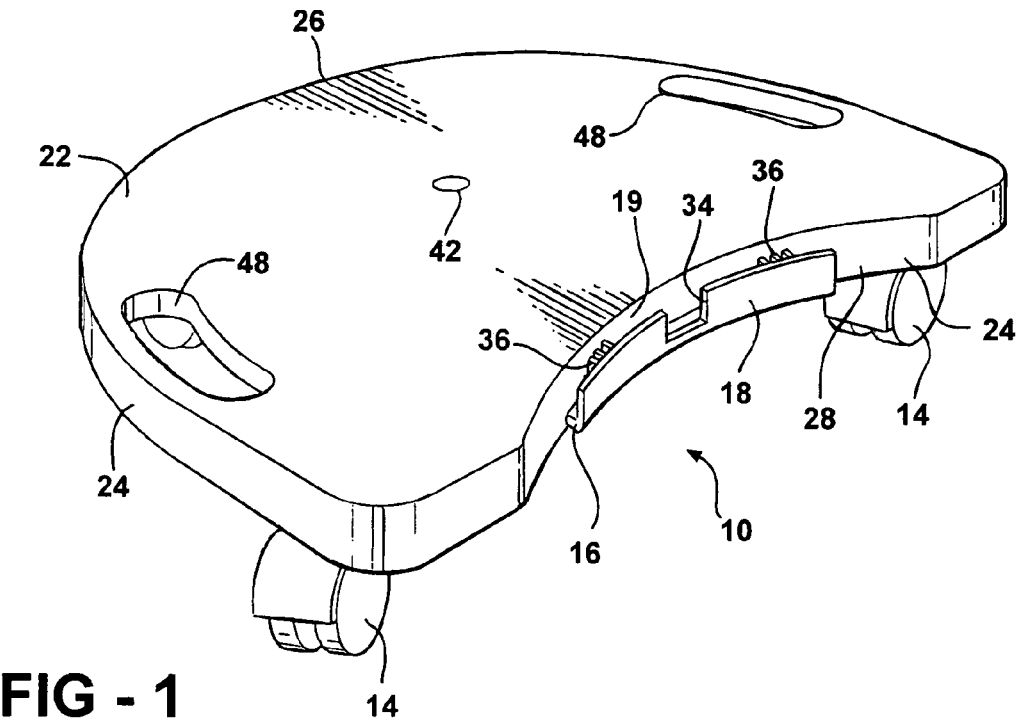
FIG. 1 is a top perspective view of the scooter.

The present invention will now be described, by way of example, with reference to the accompanying drawings in which the scooter is generally shown at 10.

According to the most basic conception of the invention, the scooter 10 includes a platform 12 and at least three casters 14 extending downwardly from the platform to support it in rolling movement. The scooter 10 further includes a horizontal flange 16 extending away from the platform 12; and a vertical flange 18 extending from the horizontal flange 16. In this way, the platform 12, the horizontal flange 16, and the vertical flange 18 define a space or groove 19 that is adapted to receive a mating tongue 20 on a second scooter whereby the scooter 10 may connect with the second scooter. The platform 12 may include a horizontal top surface 22 and at least one vertical side surface 24 extending down from the top surface; and the horizontal flange 16 may extend from this side surface 24.

According to one preferred embodiment, the platform 12 has a projecting front-end 26 spaced away from a recessed back-end 28. The projecting front-end 26 is preferably convex, with the recessed back-end 28 being concave. This configuration is shown clearly in FIGS. 1–4 and 7. The projecting front-end may also be triangular, with the recessed back-end being V-shaped. Other projecting/recessed shapes of the platform are also possible.

Figure 5:
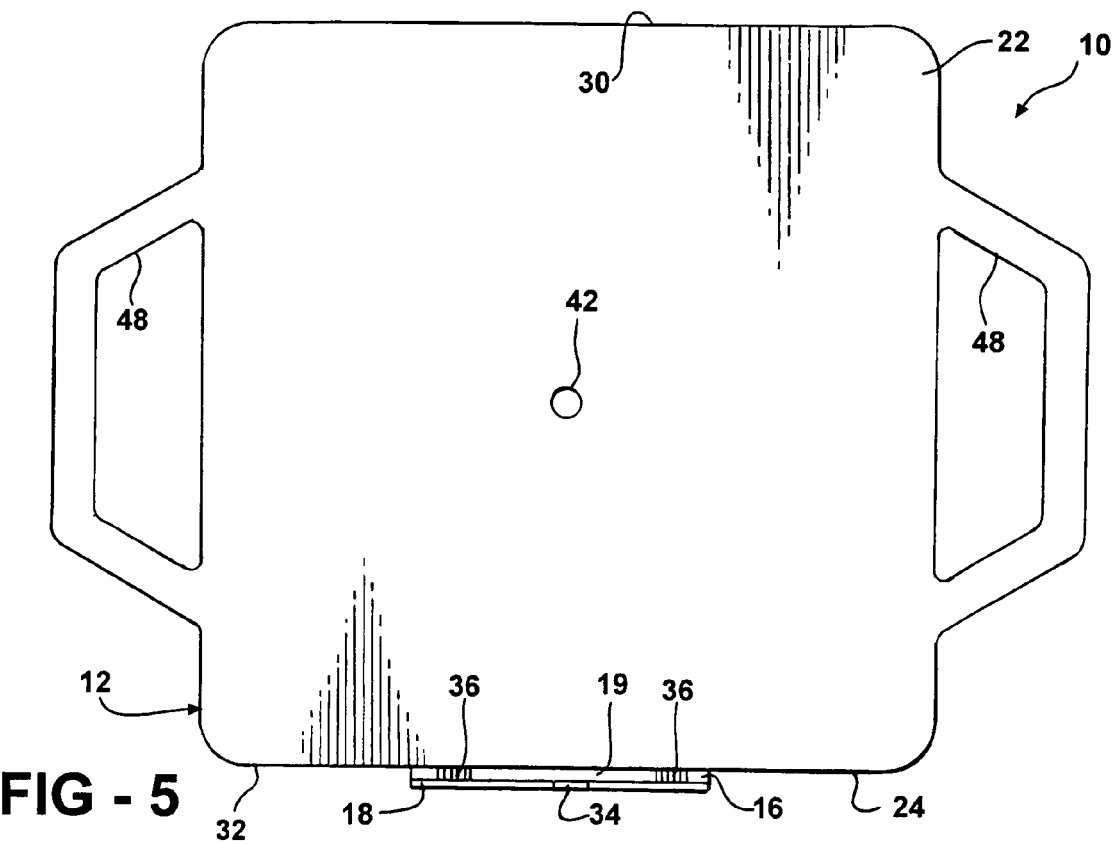
FIG. 5 is a top view of an alternative embodiment.
Figure 6:
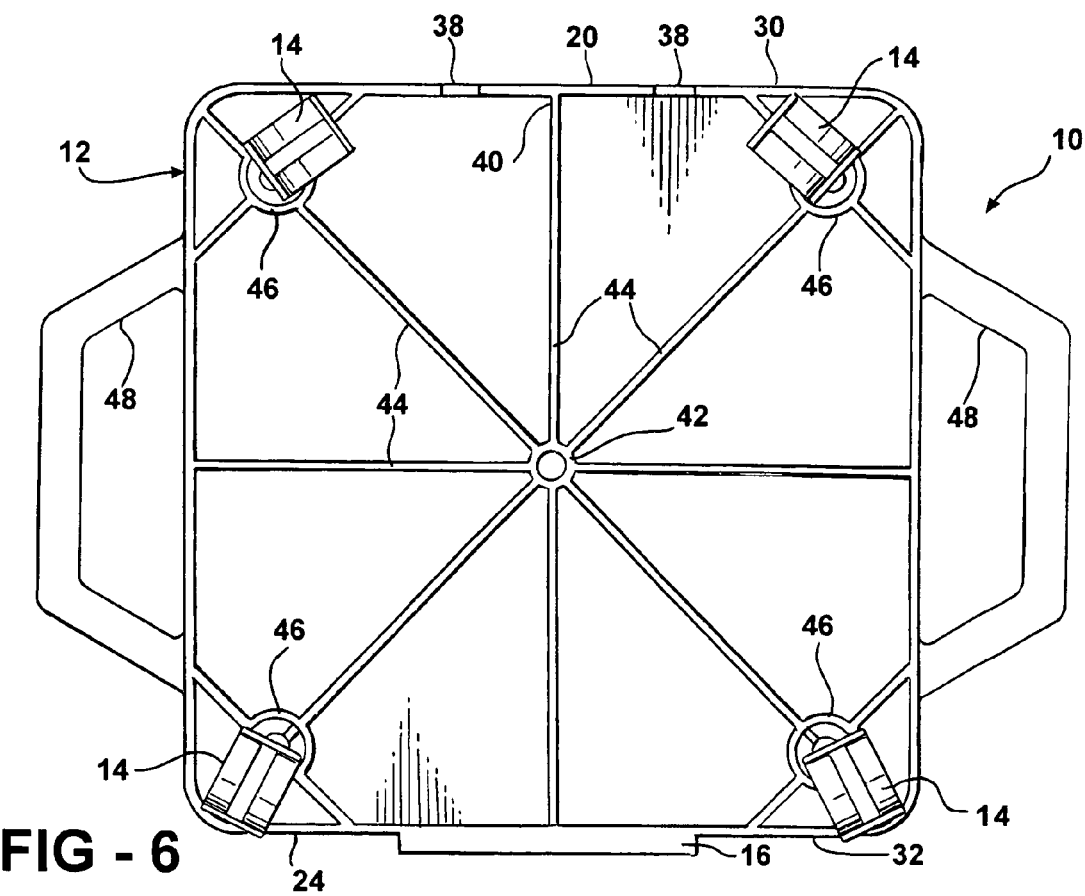
FIG. 6 is a bottom view of the alternative embodiment

Still within the scope of the present invention, the platform may have the front-end that does not project, and the back-end that does not recess, such that the front-end and the back-end are parallel to one another. For example, a generally square configuration is shown in FIGS. 5, 6, and 8, with a flat front end 30 and a flat rear end 32. The general shape of the scooter 10 is not critical.

According to a preferred embodiment shown in FIGS. 1–4 and 7, the scooter 10 has the tongue 20 located at the projecting front-end 26, and the groove 19 located at the recessed back-end 28. The horizontal flange 16 extends away from the recessed back-end 28. Extending up from the horizontal flange 16 is the vertical flange 18 such that the recessed back-end 28, the horizontal flange 16, and the vertical flange 18 define the groove 19. Disposed at the mid-point of the vertical flange 18 is a notch 34. Two sets of groove reinforcing ribs 36 are disposed in the groove 19—one set on each side of the notch 34. These ribs 36 support the vertical flange 18 against loads that result from connecting two scooters.

Located at the projecting front-end 26 is the tongue 20, which extends downwardly from the platform 12. As shown in the Figures, the tongue 20 is spaced away from the vertical side surface 24 that extends most of the way around the scooter 10. The tongue 20 is spaced away from the side surface 24 on either side with a notch 38 as shown in the Figures. A number of tongue-reinforcing ribs 40 are disposed between the platform 12 and the mid-point of the tongue 20. These reinforcing ribs 40 support the tongue 20 against loads that will pull on the tongue 20 when two scooters are connected with the tongue 20 disposed in the groove 19. The tongue 20 is dimensioned so that it fits snugly within the groove 19 as shown in the Figures. Similarly, the notch 34 on the vertical flange 18 is dimensioned so that the tongue reinforcing ribs 40 fit snugly inside it. Also, the notches 38 on either side of the tongue 20 are sized so that the groove reinforcing ribs 36 fit snugly within the notches 38.

Located at the center of the platform 12 is an opening 42 to allow for the insertion of a stacking pole (not shown). Stacking poles are used to conveniently place a plurality of scooters 10 on top of one another for ease in storage. While the scooters 10 are stacked, the stacking pole 42 also prevents horizontal movement.

Beneath the platform 12 and radiating outwardly from the opening 42 are a number of reinforcing beams 44 that extend to the vertical side surface 24 and the tongue 20. These beams 44 provide stiffness and rigidity to the platform 12. Preferably, the beams 44 are molded onto the bottom of the platform 12.

Figure 2:
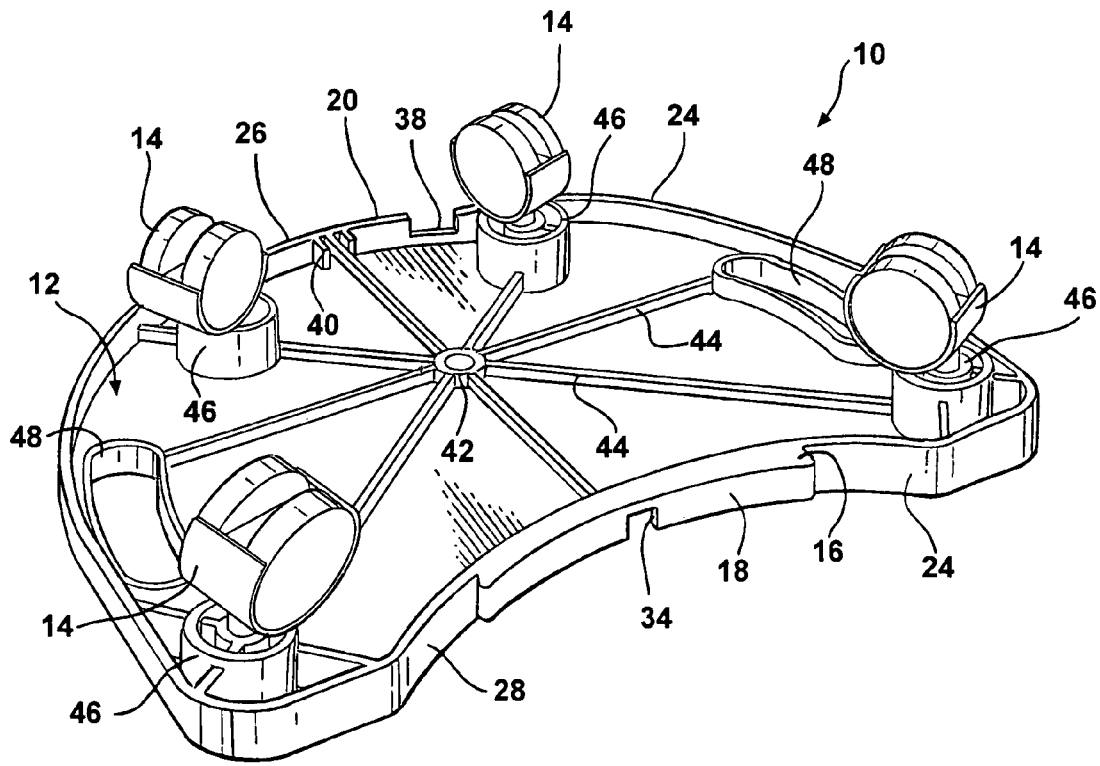
FIG. 2 is a bottom perspective view of the scooter.
Figure 3:
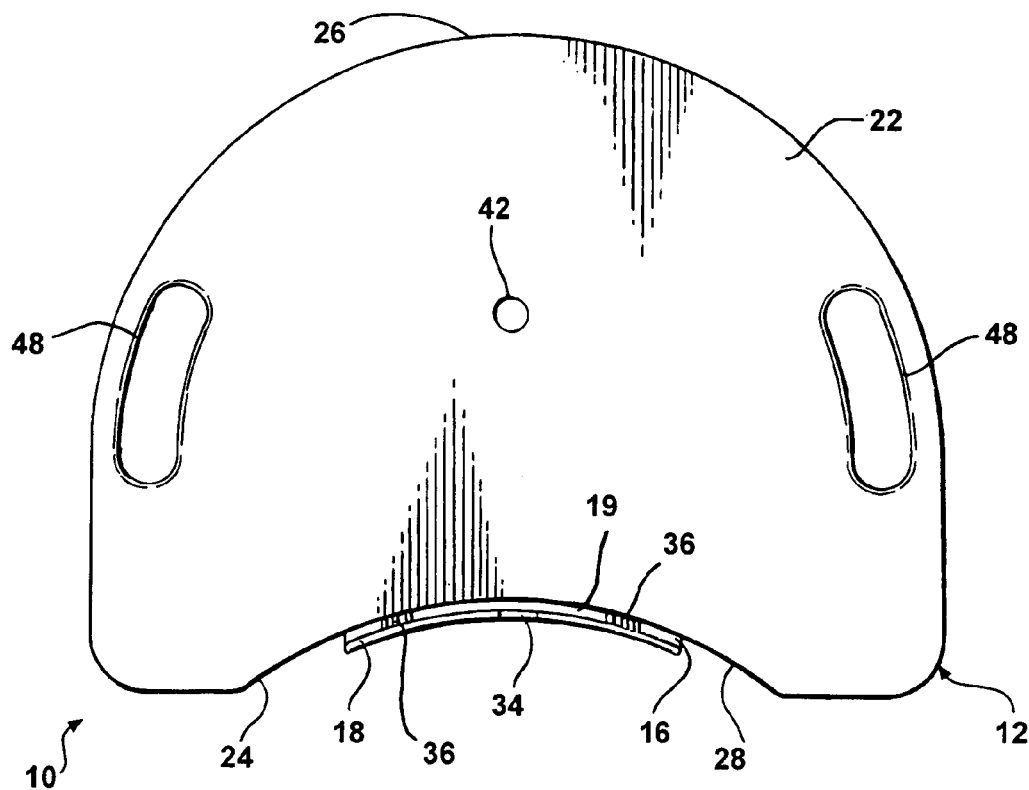
FIG. 3 is a top view of the scooter.
Figure 4:
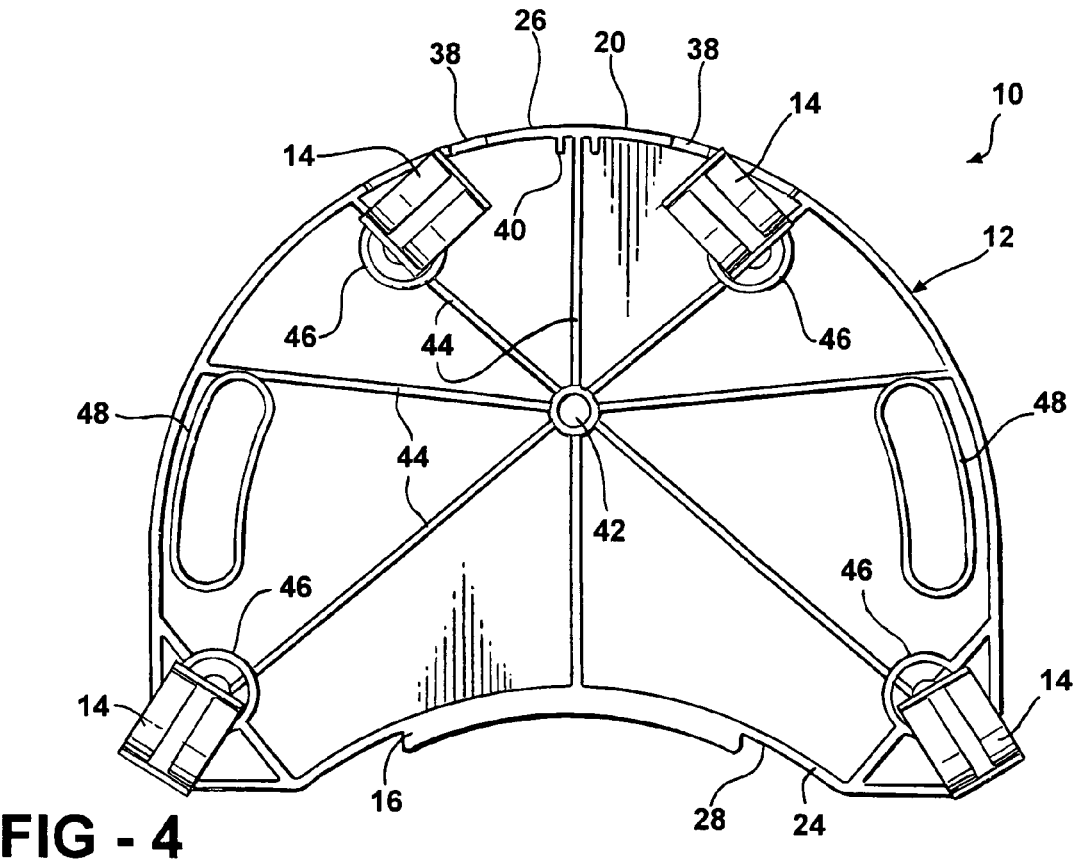
FIG. 4 is a bottom view of the scooter.

The scooter 10 has four casters 14 extending downwardly from the platform 12 that allow the scooter 10 to move as directed by the rider. The casters 14 are conventional casters. They snap fit into cylindrical receptacles 46 molded into the bottom of the platform 12 as shown in FIGS. 2, 4, and 6.

The scooter 10 has at least one handle aperture 48 through the platform 12. To stabilize the rider's position on top of the scooter 10, the rider anchors himself or herself by grasping the handle aperture 48. The handle aperture 48 can also be grasped to aid in carrying the scooter 10 while it is not used. Configurations for handles 48 are shown in the Figures. Preferably, there are two handles 48.

The platform 12 is desirably formed with injection molding techniques from a heavy-duty plastic. One suitable material is polyethylene.

In operation, a person may connect two scooters 10 together with the tongue 20 of a back scooter mating within the groove 19 of a front scooter to create a horizontal nesting arrangement. As mentioned, the tongue 20 fits snugly within the groove 19; and the various notches 34, 38 provide clearance for the various reinforcing ribs 36, 40. The tongue-and-groove style of mating prevents horizontal separation of the two connected scooters 10. In other words, one scooter 10 must be lifted in order to cause a separation.

The arrangement described above also prevents sliding movement between the tongue 20 and groove 19. The tongue 20 of the back scooter fits snugly between the reinforcing ribs 36 located in the groove 19 of the front scooter. Simultaneously, the reinforcing ribs 40 located between the tongue 20 and the platform 12 of the back scooter fit snugly in the notch 34 of the vertical flange 18 of the front scooter.

Figure 7:
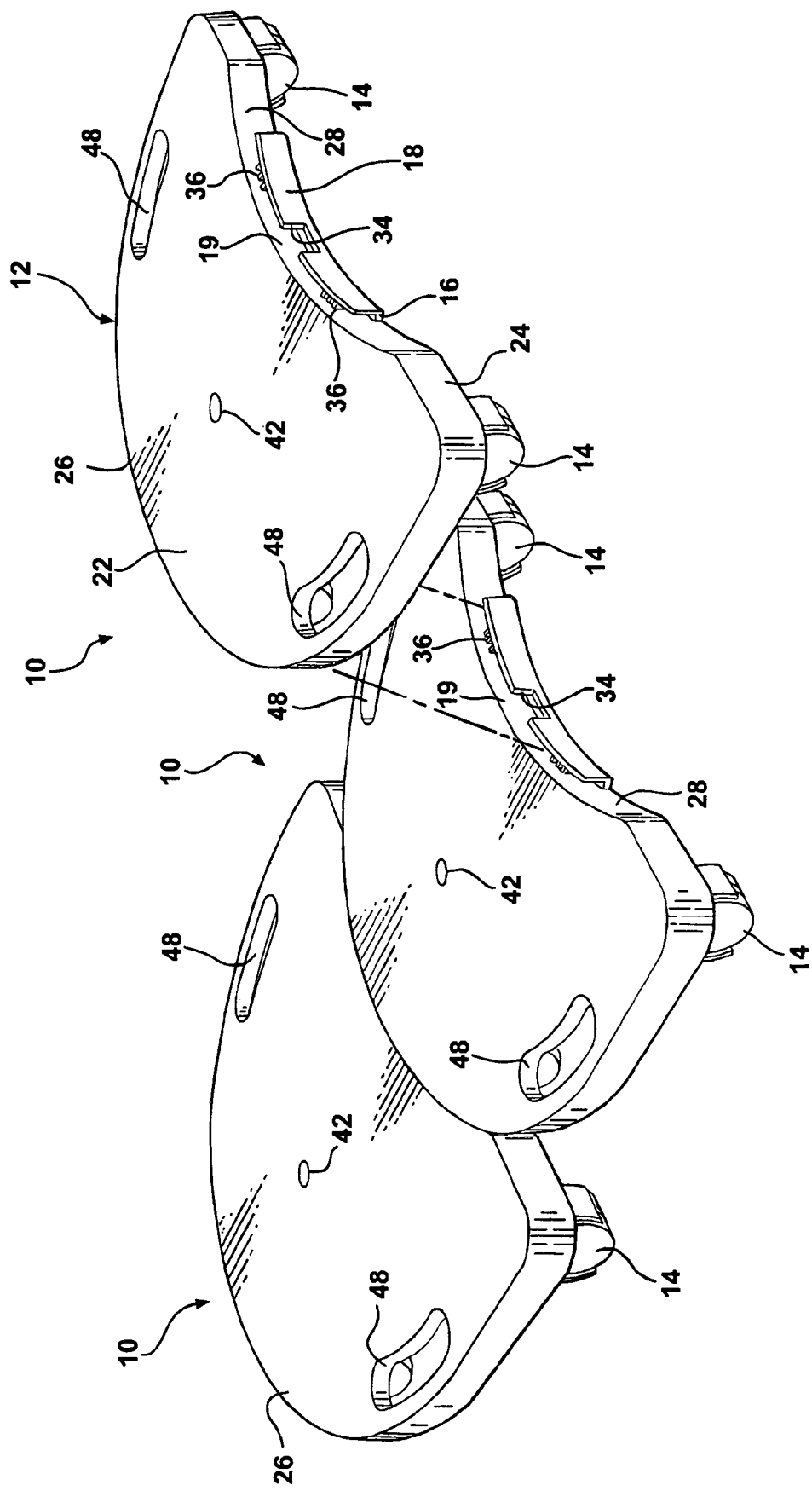
FIG. 7 is a top perspective view of three scooters, with two scooters connected together and one exploded away.

FIGS. 7 and 8 show two or more scooters 10 connected together in the flush manner that the invention allows. Accordingly, a person may readily construct a chain of scooters 10 to permit multiple riders, or to permit a single rider to ride in a supine, prone, or sitting position.

Although the preferred embodiment of the present invention has been disclosed, various changes and modifications may be made without departing from the scope of the invention as set forth in the appended claims.

I claim:

1. A toy scooter comprising:
   (a) a platform having a horizontal top surface and at least one vertical side surface extending downwardly from the top surface to a bottom end;
   (b) at least three casters extending downwardly from the platform to support the platform in rolling movement;
   (c) the scooter further comprising:
      (i) a horizontal flange extending away from the vertical side surface at the bottom end; and
      (ii) a vertical flange extending upwardly from the horizontal flange wherein the vertical side surface, the horizontal flange and the vertical flange define a groove adapted to receive a mating tongue on a second scooter for joining the scooter to the second scooter in close mating relationship so that at least one person can ride two or more scooters at the same time.

2. A toy scooter comprising:
   (a) a platform having a horizontal top surface and at least one vertical side surface disposed below the top surface;
   (b) at least three casters extending downwardly from the platform to support the platform in rolling movement; and,
   (c) the vertical side surface defining a notch adapted to receive a mating tongue on a second scooter for joining the scooter to the second scooter in close mating relationship with abutting vertical side surfaces to create an enlarged horizontal top surface that at least one person can ride upon.

3. A toy scooter comprising:
   (a) a platform having a horizontal top surface and at least one vertical side surface extending downwardly from the top surface to a bottom end;
   (b) at least three casters extending downwardly from the platform to support the platform in rolling movement;
   (c) the scooter further comprising a connection feature for receiving a downwardly extending mating tongue on a second scooter, with the connection feature including:
      (i) at least one horizontal flange extending away from the vertical side surface at the bottom end; and
      (ii) a vertical flange extending upwardly from each horizontal flange.

* * * * *

UNITED STATES PATENT AND TRADEMARK OFFICE
CERTIFICATE OF CORRECTION

PATENT NO.       : 7,213,819 B2                                  Page 1 of 1
APPLICATION NO.  : 10/392209
DATED            : May 8, 2007
INVENTOR(S)      : Kurt K. Carbonero It is certified that error appears in the above-identified patent and that said Letters Patent is hereby corrected as shown below:

On the title page item [57]:
ABSTRACT

Line 1 after "scooter" delete "includes" and insert --comprises--

Signed and Sealed this

Second Day of September, 2008

JON W. DUDAS
*Director of the United States Patent and Trademark Office*